(12) United States Patent
McJunkin et al.

(10) Patent No.: US 7,407,176 B2
(45) Date of Patent: Aug. 5, 2008

(54) BICYCLE STEM WITH INTERLOCKING JOINT IN THE HANDLEBAR CLAMP AND ASSOCIATED METHODS

(75) Inventors: Mark P. McJunkin, Atlanta, GA (US); Robert J. DeRose, Macon, GA (US); Brian H. Thomson, Warner Robins, GA (US); Loronzo H. Thomson, Byron, GA (US)

(73) Assignee: L.H. Thomson Company, Inc., Macon, GA (US)

( * ) Notice: Subject to any disclaimer, the term of this patent is extended or adjusted under 35 U.S.C. 154(b) by 224 days.

(21) Appl. No.: 10/842,261

(22) Filed: May 10, 2004

(65) Prior Publication Data

US 2005/0248120 A1    Nov. 10, 2005

(51) Int. Cl.
*B62K 21/00* (2006.01)
(52) U.S. Cl. ............... 280/279; 280/280; 403/289; 403/290; 74/551.1
(58) Field of Classification Search ........... 280/279, 280/280; 403/289, 290; 74/551.1–551.8
See application file for complete search history.

(56) References Cited

U.S. PATENT DOCUMENTS

| | | | | |
|---|---|---|---|---|
| 4,043,688 A | 8/1977 | Humlong | ...... | 403/209 |
| D285,295 S | 8/1986 | Kirkpatrick | ...... | D12/118 |
| 4,916,970 A | 4/1990 | McMurtrey | ...... | 74/555.1 |
| D341,801 S | 11/1993 | McCormack et al. | ...... | D12/118 |
| 5,273,302 A | 12/1993 | Ureel | ...... | 280/279 |
| 5,323,664 A | 6/1994 | Fairfield et al. | ...... | 74/551.3 |
| 5,509,328 A * | 4/1996 | Lai | ...... | 74/551.3 |
| D381,296 S | 7/1997 | Kurke et al. | ...... | D12/118 |
| 5,881,606 A * | 3/1999 | Roddy | ...... | 74/551.3 |
| D416,521 S | 11/1999 | Giard | ...... | D12/118 |
| 6,058,800 A * | 5/2000 | Giard | ...... | 74/551.1 |
| 6,186,027 B1 * | 2/2001 | Nielsen | ...... | 74/551.1 |
| 6,192,773 B1 * | 2/2001 | Liao | ...... | 74/551.3 |
| 6,309,135 B1 * | 10/2001 | Thomson et al. | ...... | 403/344 |
| D451,847 S | 12/2001 | Thomson et al. | ...... | D12/118 |
| 2002/0157499 A1 * | 10/2002 | Liao | ...... | 74/551.1 |
| 2002/0166406 A1 * | 11/2002 | Dunlap | ...... | 74/551.1 |

FOREIGN PATENT DOCUMENTS

FR    2531026    2/1984

OTHER PUBLICATIONS

"Evolve", Product Specifications, RaceFace Performance Products, available at www.raceface.com/components/components.php?id=26.
"Deus", Product Specifications, RaceFace Performance Products, available at www.raceface.com/components/components.php?id=25.
"EA70 Welded Aluminum Stem", Easton, available at www.eastonbike.com/COMPONENTS/stem.ea70.html.

\* cited by examiner

*Primary Examiner*—Lesley D. Morris
*Assistant Examiner*—Michael R Stabley
(74) *Attorney, Agent, or Firm*—Allen Dyer Doppelt Milbrath & Gilchrist

(57) ABSTRACT

A bicycle stem includes a handlebar clamping portion and handlebar clamping member having respective first and second clamp surfaces defining interlocking joints. Each interlocking joint may include a recess and a projection therein to resist relative sliding motion in a direction generally parallel to an axis of a handlebar-receiving passageway to thereby resist torsional loading. A plurality of fasteners may secure the handlebar clamp member to the handlebar clamping portion.

22 Claims, 4 Drawing Sheets

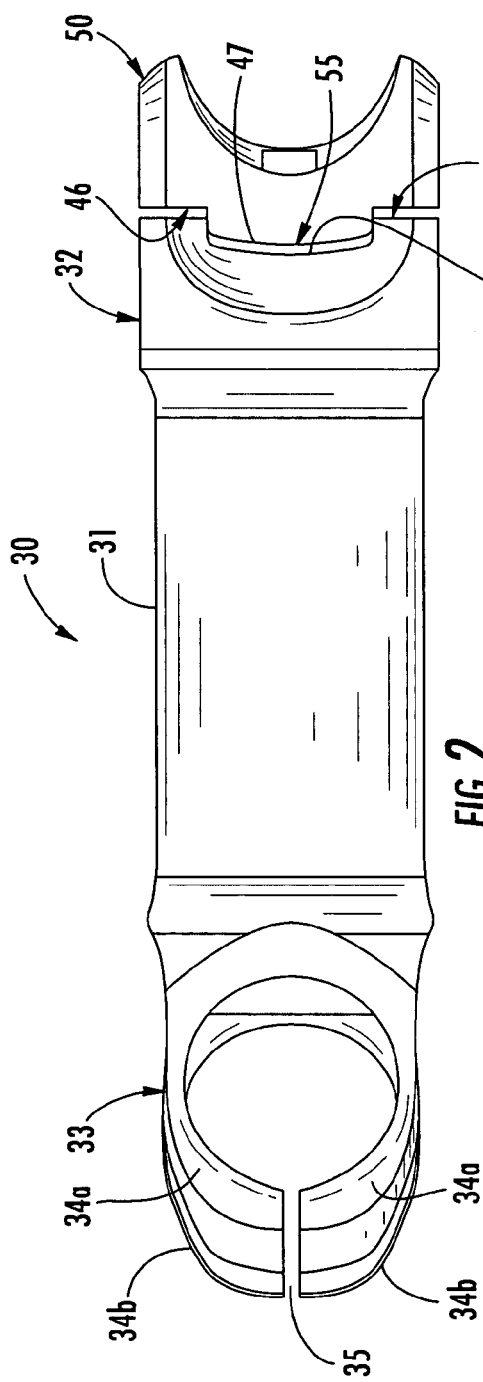
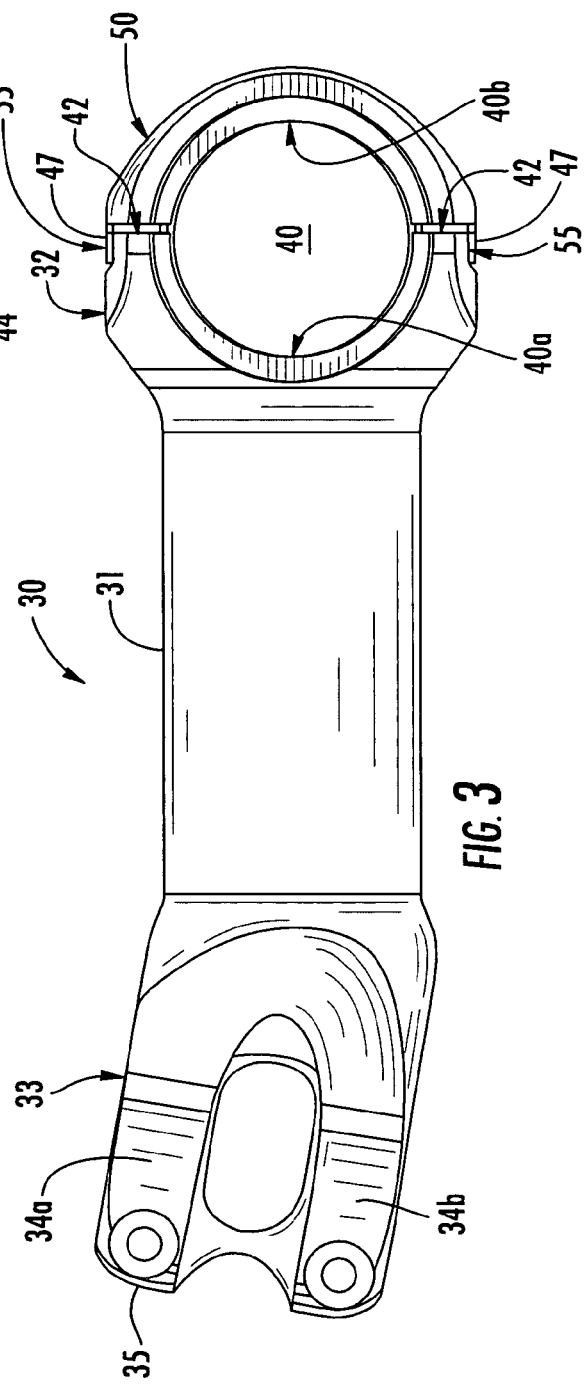
FIG. 2
FIG. 3

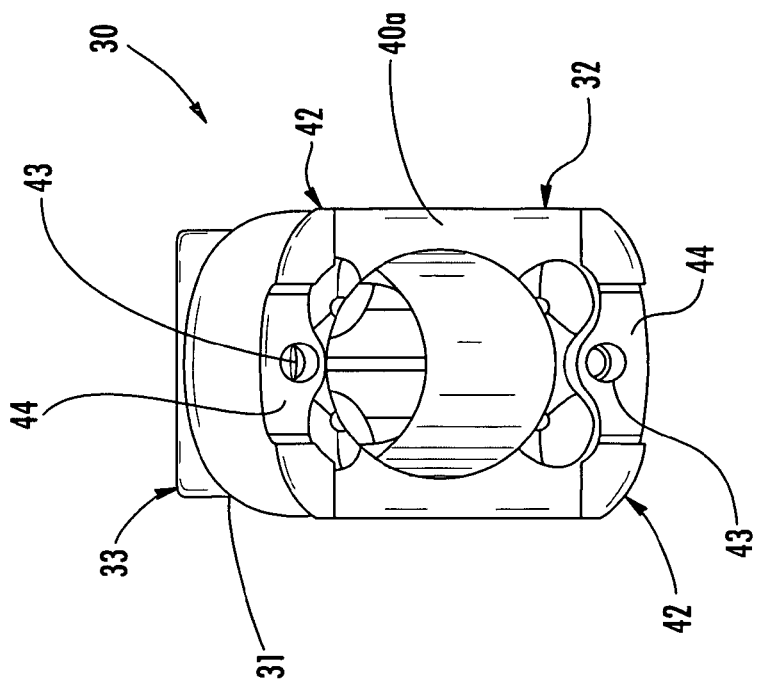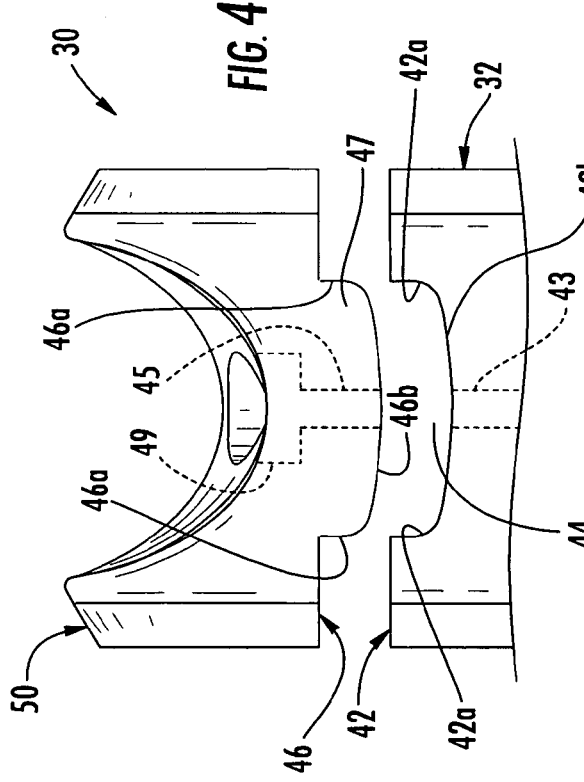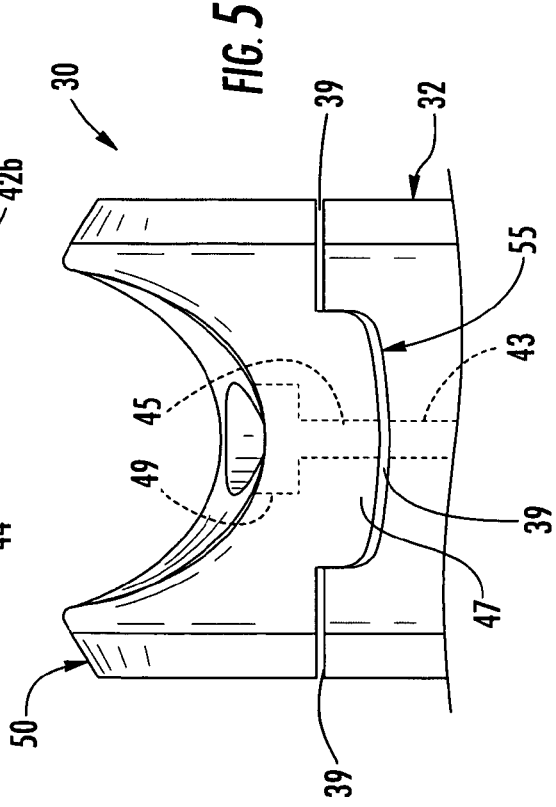

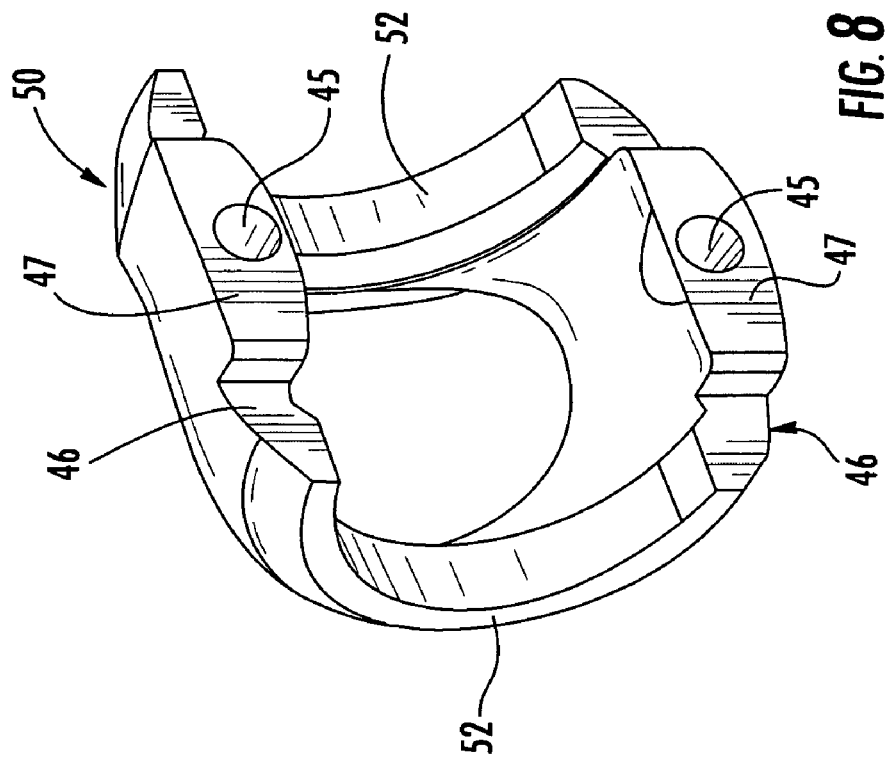
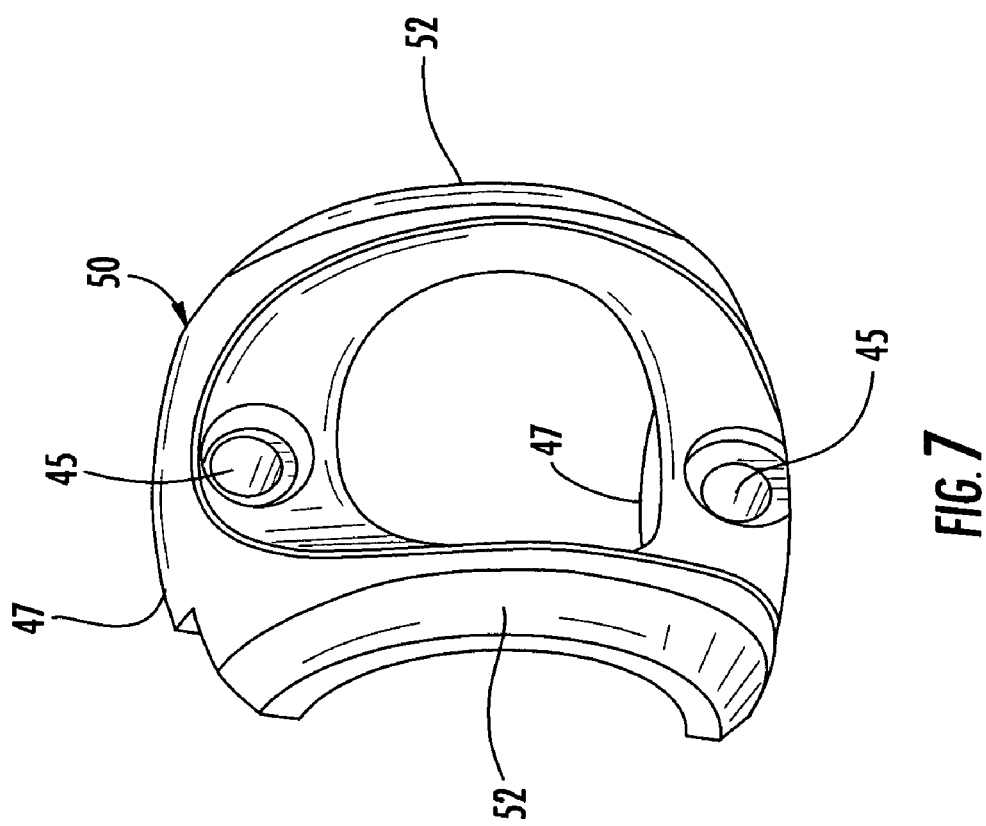

BICYCLE STEM WITH INTERLOCKING JOINT IN THE HANDLEBAR CLAMP AND ASSOCIATED METHODS

FIELD OF THE INVENTION

The present invention relates to the field of bicycles, and more particularly, to a bicycle stem for connecting the steering tube to the handlebar of a bicycle and associated methods.

BACKGROUND OF THE INVENTION

Bicycles are widely used for transportation and recreation. A typical bicycle includes a rear wheel carried by a frame and a front wheel carried by a fork that, in turn, is rotatably connected to a forward portion of the frame. In particular, a steering tube is connected at its lower end to the fork and extends through a corresponding passageway defined in the forward portion of the frame. An upper portion of the steering tube is connected to a bicycle stem.

The bicycle stem includes a steering tube clamping portion that clamps to the upper end of the steering tube. A body portion inclines forwardly from the steering tube clamping portion and terminates at a handlebar clamping portion. The incline is generally upward for mountain biking and downward for road biking, as desired by the rider. Of course, the medial portion of the handlebar is connected to the handlebar clamping portion of the stem. The rider is thus able to steer the front wheel by turning the handlebar, and also obtain pedaling leverage and maintain balance by pushing and/or pulling on the handlebar.

The stem is important for proper orientation and positioning of the rider relative to the bicycle. In addition, the stem is desirably relatively strong to avoid potentially catastrophic failure, and is also desirably lightweight to reduce the burden on the rider. Mountain or off-road biking can put especially high demands on the strength of the stem. Road bikes may also place high demands on the bicycle stem in terms of both required strength and being relatively lightweight.

The stem also desirably has relatively high torsional stiffness, that is, a resistance to allowing the handlebar to rotate as the rider pushes on one side while pulling on the other, for example. If the torsional stiffness is too low, the rider's energy is more quickly and wastefully depleted. Moreover, if the torsional strength is insufficient the stem may fail.

A widely used type of bicycle stem includes a body portion or body tube and a steering tube clamp connected to an end of the body tube. The steering tube clamp is in the form of a split tube with a vertical slot opposite the body tube. One or typically two bolts or other fasteners are used to secure the steering tube clamping portion together at the vertical slot. Another type of steering tube clamping arrangement is disclosed in U.S. Pat. No. 6,309,135 B1 to Thomson et al. assigned to the assignee of the present invention and the entire contents of which are incorporated herein by reference. This patent also discloses a unique and widely mimicked four-bolt handlebar clamping member cooperating with the handlebar clamping portion of the stem to grip the handlebar. The handlebar clamping portion defines one semicylinder and the handlebar clamping member defines the other semicylinder to define the cylindrical passageway for receiving the handlebar therein.

The four-bolt handlebar clamping arrangement has proven itself to provide high torsional stiffness. The DEUS bicycle stem offered by Raceface Performance Products of New Westminster Canada also has a four-bolt configuration with the mating clamp surfaces being slightly angled.

A number of bicycle stems have a similar handlebar clamp construction with two medially positioned bolts or fasteners instead of the four corner bolts. For example, U.S. Pat. No. 5,509,328 to Lai and Des. 341,801 to McCormack et al., and published application No. 2002/0166406 A1 to Dunlap each show such two-bolt handlebar clamping arrangements for bicycle stems. The EVOLVE model bicycle stem, also from Raceface, also has a two-bolt configuration.

Although the two-bolt handlebar clamping arrangements may be lighter than the four-bolt arrangements, the two-bolt arrangements may not have sufficient resistance to torsional loads applied to the clamp. Accordingly, the rider may fatigue more easily and/or the clamp may tend to fail prematurely.

SUMMARY OF THE INVENTION

In view of the foregoing background, it is therefore an object of the invention to provide a bicycle stem which securely engages the handlebar of the bicycle and which can withstand torsional loads imparted to the stem during riding.

This and other objects, features and advantages in accordance with the present invention are provided by a bicycle stem comprising a handlebar clamping portion, and a handlebar clamping member having respective clamp surfaces defining at least one interlocking joint to resist relative sliding motion in a direction generally parallel to an axis of the handlebar-receiving passageway to thereby resist torsional loading. More particularly, the stem may include a body portion, a steering tube clamping portion connected to a first end of the body portion, and the handlebar clamping portion may be connected to a second end of the body portion. The handlebar clamping portion may define a first part of a handlebar-receiving passageway, and have a pair of spaced apart first ends defining a respective pair of spaced apart first clamp surfaces on opposite sides of the handlebar-receiving passageway. The handlebar clamp member may define a second part of the handlebar-receiving passageway, and have a pair of spaced apart second ends defining a respective pair of spaced apart second clamp surfaces on opposite sides of the handlebar-receiving passageway. The first and second clamp surfaces may define at least one interlocking joint on each opposite side of the handlebar-receiving passageway, with each interlocking joint comprising a recess and a projection therein. The stem may also include a plurality of fasteners for securing the handlebar clamp member to the handlebar clamping portion.

The first and second parts of the handlebar-receiving passageway may define a cylindrical passageway. Thus, each of the first and second clamp surfaces may have at least one circumferential portion extending in a circumferential direction relative to the cylindrical passageway to provide the interlocking joint. The at least one circumferential portion may comprise a pair of spaced apart circumferential portions, and each first and second clamp surface may further have a longitudinal portion extending between the pair of spaced apart circumferential portions. Each of the circumferential portions may have a length in a range of about 2-10 mm, and each of the longitudinal portions may have a length in a range of about 5-25 mm. In addition, the first and second parts of the handlebar-receiving passageway may be semicylindrical.

In some embodiments, the handlebar clamping portion may have a plurality of first fastener-receiving passageways therein, and wherein the handlebar clamp member may have a plurality of second fastener-receiving passageways therein aligned with respective first fastener-receiving passageways. These first and second fastener-receiving passageways may be aligned so that a fastener extends through each of the interlocking joints. The handlebar clamp may also have a respective counterbore in communication with each of the second fastener-receiving passageways. Each of the first fastener-receiving passageways may be internally threaded to receive the threaded shaft of a fastener, while an enlarged head of the fastener is received in a respective counterbore.

In addition, the handlebar clamp member may comprise a pair of arcuate bands extending between the second ends. The body portion, handlebar clamping portion and steering tube clamping portion may be integrally formed as a monolithic unit. The body portion may comprise a tube for strength and reduced weight.

A method aspect of the invention is for making a bicycle stem. The method may include forming a handlebar clamping portion connected to an end of a body portion and defining a first part of a handlebar-receiving passageway. The handlebar clamping portion may have a pair of spaced apart first ends defining a respective pair of spaced apart first clamp surfaces on opposite sides of the handlebar-receiving passageway. The method may also include forming a handlebar clamp member defining a second part of the handlebar-receiving passageway, with the handlebar clamp member having a pair of spaced apart second ends defining a respective pair of spaced apart second clamp surfaces on opposite sides of the handlebar receiving passageway. Forming the handlebar clamping portion and handlebar clamping member may further comprise forming the first and second clamp surfaces to define at least one interlocking joint on each opposite side of the handlebar-receiving passageway. Each interlocking joint may comprise a recess and a projection therein to resist relative sliding motion in a direction generally parallel to an axis of the handlebar-receiving passageway to thereby resist torsional loading. The method may also include providing a plurality of fasteners for securing the handlebar clamp member to the handlebar clamping portion.

BRIEF DESCRIPTION OF THE DRAWINGS

FIG. 2 is a top plan view of the bicycle stem as shown in FIG. 1 with the fasteners not shown for clarity of explanation.

FIG. 3 is a side elevation view of the bicycle stem as shown in FIG. 2.

FIG. 4 is an enlarged top plan view of the handlebar clamping portion and handlebar clamping member of the bicycle stem as shown in FIG. 1 illustrated prior to assembly and with the fasteners not shown for clarity of explanation.

FIG. 5 is an enlarged top plan view as shown in FIG. 4 after assembly.

FIG. 6 is an end view of the handlebar clamping portion of the bicycle stem as shown in FIG. 1 with the handlebar clamping member removed for clarity of explanation.

FIG. 7 is an enlarged external perspective view of the handlebar clamping member of the bicycle stem as shown in FIG. 1.

FIG. 8 is an enlarged internal perspective view of the handlebar clamping member of the bicycle stem as shown in FIG. 1.

DETAILED DESCRIPTION OF THE PREFERRED EMBODIMENTS

Figure 1:
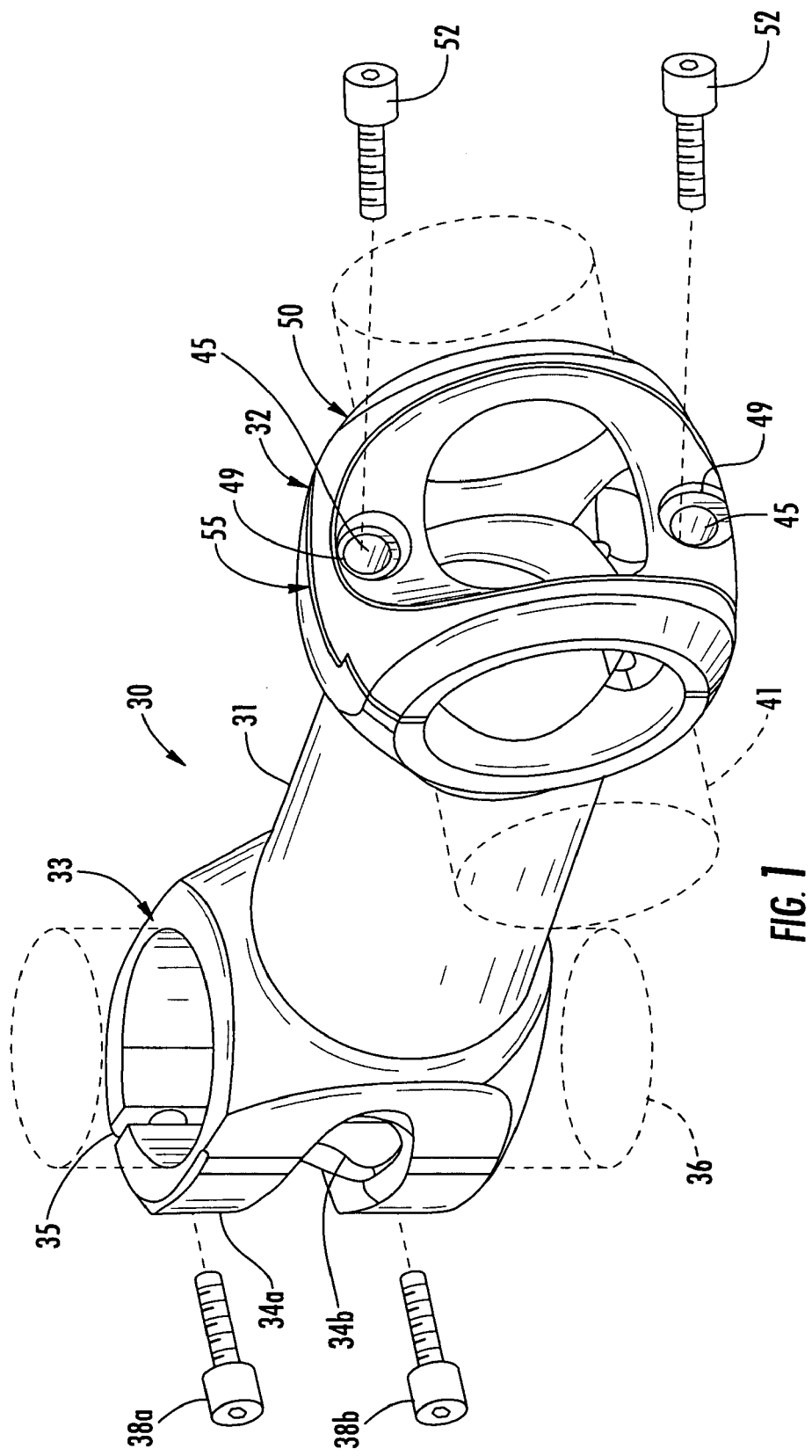
FIG. 1 is a front perspective view of the bicycle stem in accordance with the present invention with the fasteners shown exploded from the remainder of the stem.

The present invention now will be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Referring to FIGS. 1-3, a bicycle stem 30 in accordance with the invention is now first described. The bicycle stem 30 illustratively includes a body portion 31 having opposing first and second ends, a steering tube clamping portion 33 connected to the first end of the body portion, and a handlebar clamping portion 32 connected to the second end of the body portion. A handlebar clamping member 50 is removably secured to the handlebar clamping portion 32 as will be described below in greater detail. The removable feature of the clamping member 50 permits installation of a handlebar without having to remove brake and/or gear shift levers from the handlebar as will be appreciated by those skilled in the art.

The body portion 31, handlebar clamping portion 32 and steering tube clamping portion 33 may be integrally formed as a monolithic unit from a lightweight metal, such as aluminum or other metal or alloy. Alternately, the stem 30 may be integrally formed as a monolithic unit from a composite material, such as a carbon-fiber composite material, as will be appreciated by those skilled in the art. Of course, the stem could also be made by joining portions together as will be appreciated by those skilled in the art.

In the illustrated embodiment of the bicycle stem 30, the steering tube clamping portion 33 is provided by a pair of upper bands 34a and lower bands 34b separated at their ends by a vertical gap 35. Of course other configurations of steering tube clamping arrangements may be used in other embodiments, such as the arrangement disclosed in above-mentioned U.S. Pat. No. 6,309,135 B1. The steering tube 36 is indicated by the dashed vertical tube 36 (FIG. 1). Upper and lower fasteners 38a, 38b are used to secure the steering tube clamping portion 33 around the steering tube 36. To do so, a set of passageways for receiving the fasteners 38a, 38b may be internally threaded as will be appreciated by those skilled in the art.

The body portion 31 of the illustrated stem 30 is provided by a hollow tube that gives strength without unnecessary weight. In other embodiments, the body portion 31 could be longer or shorter, could have an outer shape that is not round, and could be solid, for example, and as will also be appreciated by those skilled in the art.

Referring now additionally to FIGS. 4-8, the stem 30 includes a handlebar clamping portion 32 and a handlebar clamping member 50 each having clamp surfaces defining at least one interlocking joint 55 (FIG. 5). The interlocking joints 55 resist relative sliding motion in a direction generally parallel to an axis of the handlebar-receiving passageway to thereby resist torsional loading applied thereto from the rider applying a torsional load to the handlebar 41. The handlebar clamping portion 32 defines a first part 40a (FIG. 3) of a handlebar-receiving passageway 40 (FIG. 3) that receives a handlebar as schematically shown by the dashed tube 41 in FIG. 1.

As perhaps best understood with particular reference to FIGS. 4-6, the handlebar clamping portion 32 in the illustrated embodiment, has a pair of first fastener-receiving passageways 43 therein, and has a pair of spaced apart first ends defining a respective pair of spaced apart first clamp surfaces 42 on opposite sides of the handlebar receiving passageway 40 (FIG. 3). Each of the first clamp surfaces 42 illustratively has a respective recess 44 therein in communication with a respective first fastener-receiving passageway 43. The first fastener-receiving passageway 43 may be internally threaded as shown in the illustrated embodiment, although an external nut could be provided in other embodiments, as will be appreciated by those skilled in the art.

The handlebar clamp member 50 defines a second part 40b of the handlebar-receiving passageway 40 (FIG. 3), and may have a pair of second fastener-receiving passageways 45 (FIGS. 4, 5, 7 and 8) therein. The second fastener-receiving passageways 45 may be in communication with a counterbore 49 for receiving the enlarged head connected to the threaded shaft of the fastener 52.

The handlebar clamp member 50 also illustratively has a pair of spaced apart second ends defining a respective pair of spaced apart second clamp surfaces 46. Each of the second clamp surfaces 46 illustratively has a respective projection 47 to form the interlocking joint 55 in combination with a respective recess 44 (FIGS. 4 and 5). In other embodiments, the positions of the recess and projection could be reversed. In addition, although the projection 47 is illustrated as integral with the rest of the handlebar clamping member 50 it could be provided by a separate portion, such as a dowel pin, for example, as will be appreciated by those skilled in the art. In some embodiments, especially those with the intersecting fastener 52 and interlocking joint 55, only a single such interlocking joint may be needed, although having at least one interlocking joint on each opposite side of the handlebar-receiving passageway 40 provides additional strength as will be appreciated by those skilled in the art.

Unlike a typical prior art stem using two fasteners, for example, the interlocking joint 55 of the illustrated stem 30 acts in combination with the fasteners 52 to resist torsional loads. In other words, all of the tosional load need not be carried by the fasteners 52. This additional resistance to torsional loads provided by the interlocking joint 55 also permits other parts of the stem 30 to be made lighter to thereby reduce unnecessary weight.

A respective second fastener-receiving passageway 45 illustratively extends through the projection 47 and is aligned with a respective first fastener-receiving passageway 43. Positioning of the second fastener-receiving passageway 45 through the projection 47, permits the counterbore 49 to be set down into the material while still providing a sufficient thickness of wall material for adequate strength as will be appreciated by those skilled in the art. The upper end of the fastener 52 can thus be set closer to the upper surface of the clamp member 50 so as to be less obtrusive. The second fastener-receiving passageways 45 may be provided with clearance from the fastener 52 so that the clamping member 50 can benefit from a self-centering action upon clamping to the handlebar 41. This self-centering action is in contrast to a prior art hinged clamp arrangement, for example, that may gouge a handlebar if slightly misaligned.

A respective fastener 52 (FIG. 1) may be provided in each aligned pair of first and second fastener-receiving passageways 43, 45 for securing the handlebar clamp member 50 to the handlebar clamping portion 32 as seen in FIG. 5. The first and second parts 40a, 40b of the handlebar-receiving passageway 40 may define a cylindrical passageway, as shown in the illustrated embodiment of the stem 30, for example. In addition, each part 40a, 40b may be in the form of a semicylinder as shown, although other configurations are also contemplated by the invention. In yet other embodiments, other shapes may be provided, such as to accommodate a handlebar having a shape different than cylindrical.

As shown in the illustrated stem 30, each of the first and second clamp surfaces 42, 46 may have a pair of circumferential portions 42a, 46a (FIG. 4) extending in a circumferential direction relative to the cylindrical passageway 40 to provide the interlocking joints 55. In other embodiments, only a single or more than two circumferential portions may be provided for the interlocking joint 55 as will be appreciated by those skilled in the art. These circumferential portions 42a, 46a provide the contact areas to resist relative sliding movement and thereby resist the torsional loading. In addition, each of the first and second clamp surfaces 42, 46 also illustratively has a longitudinal portion 42b, 46b (FIG. 4) extending between the spaced apart circumferential portions 42a, 46a. Each of the circumferential portions 42a, 46a may have a length in a range of about 2-10 mm, and each of the longitudinal portions 42b, 46b may have a length in a range of about 5-25 mm. Of course, other dimensions are also contemplated by the present invention.

As shown perhaps best in FIG. 5, the handlebar clamp portion 32 and the handlebar clamp member 50 may be configured to define a slight gap 39 in the circumferential direction when tightened onto the handlebar. For example, this gap 39 may be about 0.040 inches, for example, when properly tightened. This gap 39 may desirably be made equal on both sides of the stem 30 by alternate tightening of the respective fasteners 52 as will be appreciated by those skilled in the art.

It should also be noted that the fit between the circumferential portions 42a, 46a is desirably a tight slip fit as permitted by manufacturing tolerances. For example, this tight slip fit may be provided by a design gap of no greater than about 0.010 inches, although other dimensions are also possible.

As shown perhaps best in FIGS. 7 and 8, the handlebar clamp member 50 may comprise a pair of arcuate bands 53 extending between the second ends that define the second clamp surfaces 46. Other configurations for wrapping around the handlebar 41 are also possible as will be appreciated by those skilled in the art.

A method aspect of the invention is for making the bicycle stem 30 as described herein. The method may include forming a handlebar clamping portion 32 connected to an end of a body portion 31 and defining a first part 40a of a handlebar-receiving passageway 40. The handlebar clamping portion 32 may have a pair of spaced apart first ends defining a respective pair of spaced apart first clamp surfaces 42 on opposite sides of the handlebar-receiving passageway. The method may also include forming a handlebar clamp member 50 defining a second part 40b of the handlebar-receiving passageway 40, with the handlebar clamp member having a pair of spaced apart second ends defining a respective pair of spaced apart second clamp surfaces 46 on opposite sides of the handlebar-receiving passageway. Forming the handlebar clamping portion 32 and handlebar clamping member 50 may further comprise forming the first and second clamp surfaces 42, 46 to define at least one interlocking joint 55 on each opposite side on opposite side of the handlebar-receiving passageway. Each interlocking joint 55 may comprise a recess 44 and a projection 47 therein to resist relative sliding motion in a direction generally parallel to an axis of the handlebar-receiving passageway 40 to thereby resist torsional loading. The method may also include providing a plurality of fasteners 52 for securing the handlebar clamp member to the handlebar clamping portion.

A stem 30 in accordance with the present invention has been tested with an eighteen-inch bar provided with alternating opposing end forces of ninety-two pounds for over one million cycles without failure. Applicants theorize that the interlocking joint helps carry the load so that a two-bolt arrangement is as strong and durable as a four-bolt arrangement and while having less weight. Some manufacturers of carbon-fiber composite handlebars may recommend a two-bolt clamp since one-half the clamping torque is typically applied as compared to the four-bolt arrangement. Of course, the interlocking joint feature could also be used with a four-bolt configuration in other embodiments to provide additional torsional strength and torsional rigidity for the four-bolt configuration. In four-bolt embodiments of the stem, a fastener could extend through each interlocking joint, or the fasteners could straddle each interlocking joint.

The stem 30 may also include relief areas for greater compatibility with carbon-fiber composite handlebars, for example, as disclosed in commonly assigned published U.S. patent application No. 20020148323, filed Apr. 11, 2002, the entire contents of which are incorporated herein by reference. In addition, many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that other modifications and embodiments are intended to be included within the scope of the appended claims.

That which is claimed is:

1. A bicycle stem for connecting a bicycle handlebar to a bicycle steering tube, the bicycle stem comprising:
   a body portion having opposing first and second ends;
   a steering tube clamping portion connected to the first end of said body portion;
   a handlebar clamping portion connected to the second end of said body portion and defining a first part of a handlebar-receiving passageway, said handlebar clamping portion having a pair of spaced apart first ends defining a respective pair of spaced apart first clamp surfaces on opposite sides of the handlebar-receiving passageway;
   a handlebar clamp member defining a second part of the handlebar-receiving passageway, said handlebar clamp member having a pair of spaced apart second ends defining a respective pair of spaced apart second clamp surfaces on opposite sides of handlebar-receiving passageway;
   said first and second clamp surfaces defining at least one interlocking joint on each opposite side of the handlebar-receiving passageway, each interlocking joint comprising a recess and a projection therein arranged to block by physical interference relative sliding motion in a direction generally parallel to an axis of the handlebar-receiving passageway to thereby resist torsional loading; and
   a plurality of fasteners for securing said handlebar clamp member to said handlebar clamping portion.

2. A bicycle stem according to claim 1 wherein said first and second parts of said handle-bar receiving passageway define a cylindrical passageway; and wherein each of said first and second clamp surfaces has at least one circumferential portion extending in a circumferential direction relative to said cylindrical passageway.

3. A bicycle stem according to claim 2 wherein said at least one circumferential portion comprises a pair of spaced apart circumferential portions; and wherein each of said first and second clamp surfaces further has a longitudinal portion extending between said pair of spaced apart circumferential portions.

4. A bicycle stem according to claim 3 wherein each of said circumferential portions is in a range of about 2-10 mm in length; and wherein each of said longitudinal portions is in a range of about 5-25 mm in length.

5. A bicycle stem according to claim 1 wherein each of said first and second parts of the handlebar-receiving passageway is semicylindrical.

6. A bicycle stem according to claim 1 wherein said handlebar clamping portion has a plurality of first fastener-receiving passageways therein; and wherein said handlebar clamp member has a plurality of second fastener-receiving passageways therein aligned with respective first fastener-receiving passageways.

7. A bicycle stem according to claim 6 wherein said first and second fastener-receiving passageways are aligned so that at least one of said fasteners extends through each of said interlocking joints.

8. A bicycle stem according to claim 6 wherein said handlebar clamp member has a respective counterbore in communication with each of said second fastener-receiving passageways.

9. A bicycle stem according to claim 8 wherein said first fastener-receiving passageways are internally threaded; and wherein each of said fasteners comprises a threaded shaft with an enlarged head connected thereto and received in a respective counterbore.

10. A bicycle stem according to claim 1 wherein said handlebar clamp member comprises a pair of arcuate bands extending between said second ends.

11. A bicycle stem according to claim 1 wherein said body portion, handlebar clamping portion and steering tube clamping portion are integrally formed as a monolithic unit.

12. A bicycle stem according to claim 1 wherein said body portion comprises a tube.

13. A bicycle stem for connecting a bicycle handlebar to a bicycle steering tube, the bicycle stem comprising:
    a body portion having opposing first and second ends;
    a steering tube clamping portion connected to the first end of said body portion;
    a handlebar clamping portion connected to the second end of said body portion and defining a first part of a handlebar-receiving passageway, said handlebar clamping portion having a pair of spaced apart first ends defining a respective pair of spaced apart first clamp surfaces;
    a handlebar clamp member defining a second part of the handlebar-receiving passageway, said handlebar clamp member having a pair of spaced apart second ends defining a respective pair of spaced apart second clamp surfaces; and
    said first and second clamp surfaces defining at least one interlocking joint defined by at least one recess and projection therein arranged to block by physical interference relative sliding motion in a direction generally parallel to an axis of the handlebar-receiving passageway to thereby resist torsional loading; and
    at least one fastener for securing said handlebar clamp member to said handlebar clamping portion;
    said handlebar clamping portion having at least one first fastener-receiving passageway therein and said clamp member having at least one second fastener-receiving passageway therein aligned with said at least one first fastener-receiving passageway so that said at least one fastener extends through said at least one interlocking joint.

14. A bicycle stem according to claim 13 wherein said first and second parts of said handle-bar receiving passageway define a cylindrical passageway; and wherein at least one of said first and second clamp surfaces has at least one circumferential portion extending in a circumferential direction relative to said cylindrical passageway.

15. A bicycle stem according to claim 14 wherein said at least one circumferential portion comprises a pair of spaced apart circumferential portions; and wherein each of said first and second clamp surfaces further has a longitudinal portion extending between said pair of spaced apart circumferential portions.

16. A bicycle stem according to claim 15 wherein each of said circumferential portions is in a range of about 2-10 mm in length; and wherein each of said longitudinal portions is in a range of about 5-25 mm in length.

17. A bicycle stem according to claim 13 wherein each of said first and second parts of the handlebar-receiving passageway is semicylindrical.

18. A bicycle stem according to claim 13 wherein said handlebar clamp has at least one respective counterbore in communication with said at least one second fastener-receiving passageway.

19. A bicycle stem according to claim 18 wherein said at least one first fastener-receiving passageway is internally threaded; and wherein said at least one fastener comprises a threaded shaft with an enlarged head connected thereto and received in said at least one counterbore.

20. A bicycle stem according to claim 13 wherein said handlebar clamp member comprises a pair of arcuate bands extending between said second ends.

21. A bicycle stem according to claim 13 wherein said body portion, handlebar clamping portion and steering tube clamping portion are integrally formed as a monolithic unit.

22. A bicycle stem according to claim 13 wherein said body portion comprises a tube.

* * * * *